(12) United States Patent
Albery et al.

(10) Patent No.: US 9,061,714 B1
(45) Date of Patent: Jun. 23, 2015

(54) EV BATTERY PACK PROTECTION SYSTEM UTILIZING AN UNDERCARRIAGE DEBRIS TRAP

(71) Applicant: Atieva, Inc., Redwood City, CA (US)

(72) Inventors: Mark William Albery, Redwood City, CA (US); Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 13 days.

(21) Appl. No.: 14/163,802

(22) Filed: Jan. 24, 2014

(51) Int. Cl.
  *B62D 21/15* (2006.01)
  *B60L 11/18* (2006.01)
  *B60K 1/04* (2006.01)

(52) U.S. Cl.
  CPC ........... *B62D 21/155* (2013.01); *B60L 11/1879* (2013.01); *H01M 2200/00* (2013.01); *B60K 2001/0438* (2013.01)

(58) Field of Classification Search
  CPC ............... B62D 21/155; B62D 21/152; B60K 2001/0438; H01M 2200/00; B60L 11/1879
  See application file for complete search history.

(56) References Cited

U.S. PATENT DOCUMENTS

| | | | | |
|---|---|---|---|---|
| 5,372,216 | A * | 12/1994 | Tsuji et al. | 180/274 |
| 2006/0278463 | A1* | 12/2006 | Anzai et al. | 180/312 |
| 2009/0021052 | A1* | 1/2009 | Kato | 296/203.01 |
| 2009/0226806 | A1* | 9/2009 | Kiya | 429/186 |
| 2011/0068606 | A1* | 3/2011 | Klimek et al. | 296/187.08 |
| 2012/0187720 | A1* | 7/2012 | Tomozawa et al. | 296/187.09 |
| 2013/0270860 | A1* | 10/2013 | Young et al. | 296/187.09 |
| 2013/0270862 | A1* | 10/2013 | Hotta et al. | 296/187.09 |

* cited by examiner

*Primary Examiner* — Drew Brown
(74) *Attorney, Agent, or Firm* — Patent Law Office of David G. Beck

(57) ABSTRACT

A battery pack protection system is provided for use with an electric vehicle in which the battery pack is mounted under the car. The system utilizes a debris capture plate mounted in front of the battery pack and positioned such that the leading edge of the mounted capture plate is positioned closer to the underlying road surface than the lowermost battery pack surface. Capture plate stiffeners, which are mounted to the capture plate, use deformation control features (e.g., notches) to promote a preconfigured pattern of capture plate deformation when a piece of debris impacts the plate's leading edge. The deformed capture plate then traps the debris and stops it from passing under the battery pack, thereby preventing the battery pack from possible debris impact damage.

22 Claims, 8 Drawing Sheets

EV BATTERY PACK PROTECTION SYSTEM UTILIZING AN UNDERCARRIAGE DEBRIS TRAP

FIELD OF THE INVENTION

The present invention relates generally to electric vehicles and, more particularly, to a system for providing undercarriage protection to the battery pack of an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, either contained within a laptop computer or utilized in a vehicle, catching on fire. As a result, one of the primary issues impacting consumer confidence with respect to both hybrid and all-electric vehicles is the risk of a battery pack fire.

Rechargeable batteries tend to be relatively unstable and prone to thermal runaway, an event that occurs when a battery's internal reaction rate increases to such an extent that it is generating more heat than can be withdrawn. If the reaction rate and generation of heat go unabated, eventually the heat generated becomes great enough to cause the battery and materials in proximity to the battery to combust. While thermal runaway is typically the result of a battery short or a manufacturing defect, damage such as that which may occur during an accident or when road debris dents or punctures the battery pack may also lead to a thermal runaway event.

Due to the risk of a battery pack fire, hybrid and electric vehicle (EV) manufacturers use a variety of techniques to shield their battery packs from the possible damage that may result from road debris or a vehicle collision. For example, in a vehicle using a relatively small battery pack such as a hybrid, the pack may be protected by placing it within the rear trunk, behind the rear seats, under the front seats, or in another comparatively well protected location. Vehicles utilizing large battery packs typically are forced to mount the pack under the car. To protect such a pack, a ballistic shield may be located between the road surface and the bottom of the pack, for example as disclosed in co-assigned U.S. patent application No. 14/134,151, filed 19 Dec. 2013.

Although the prior art teaches a variety of mounting techniques that can either be used to place the battery pack in a relatively protected region of a car or to otherwise shield the battery pack from potential harm, given the severity of the consequences accompanying a catastrophic battery pack event, further techniques for protecting an under-carriage mounted battery pack are desired. The present invention provides such a protection system.

SUMMARY OF THE INVENTION

The present invention provides a battery pack protection system for use with an electric vehicle in which the battery pack is mounted under the car. The system utilizes a debris capture plate mounted in front of the battery pack, the capture plate configured to deform and trap debris that hits the capture plate's leading edge. The leading edge of the capture plate is positioned lower than the battery pack, i.e., the leading edge of the mounted capture plate is positioned closer to the underlying road surface than the lowermost battery pack surface. A plurality of plate stiffeners are coupled to the upper surface of the capture plate such that the lengthwise axis of each stiffener is substantially parallel to the car's longitudinal axis. Each plate stiffener includes at least one deformation control feature that promotes a preconfigured pattern of capture plate deformation when a piece of debris impacts the plate's leading edge. A blocking plate may be mounted above the leading edge of the capture plate, the blocking plate promoting downward deformation of the leading edge of the capture plate when a piece of debris impacts the plate's leading edge. The blocking plate may extend partially, or completely, over the debris capture plate.

The deformation control feature included on each plate stiffener may consist of a plurality of notches located along the upper edge of each stiffener, where the notches promote plastic hinge formation through the notches. The notches of adjacent plate stiffeners are preferably aligned with one another.

The deformation control feature included on each plate stiffener may consist of at least one notch located along the lower edge of each stiffener and positioned near the trailing edge of the debris capture plate, where the notches promote downward deformation of the rear portion of the capture plate. The notches of adjacent plate stiffeners are preferably aligned with one another.

The trailing edge of the debris capture plate may be firmly attached to a front portion of the battery pack enclosure assembly, e.g., the battery pack, via at least one of welding, brazing or bonding, or firmly attached to the front portion of the battery pack enclosure assembly using a plurality of fasteners (e.g., bolts). The perimeter of the debris capture plate, excluding the trailing edge, may be weakly attached to a plate support structure via a plurality of tack welds or a plurality of tack joints formed using a low strength adhesive.

The debris capture plate, which is preferably fabricated from a metal such as aluminum or steel, may be mounted at an angle relative to the underlying road surface, where the leading edge is positioned closer to the underlying road surface than the trailing edge of the debris capture plate. The leading edge of the debris capture plate is preferably positioned between 5 and 25 millimeters closer to the underlying road surface than the lowermost battery pack surface.

The plurality of plate stiffeners, which are preferably fabricated from a metal such as aluminum or steel, may be attached to the upper surface of the debris capture plate via at least one of welding, brazing or bonding, or attached to the upper surface of the debris capture plate using a plurality of fasteners (e.g., bolts).

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "battery pack" and "battery pack enclosure" may be used interchangeably and refer to an enclosure containing one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

In a conventional EV with a large battery pack, such as that typically required for an all-electric vehicle or a PHEV with a relatively long electric-only range, the battery pack is normally mounted under the vehicle. This mounting location is generally considered to be optimal, both from a packaging point of view in terms of minimizing the impact on the passenger and luggage compartments as well as from a vehicle performance point of view in terms of providing a low center of gravity and a desirable weight distribution. Unfortunately this location exposes the battery pack to more potential harm than it would otherwise encounter if it were mounted further from the road surface, for example behind the rear seats in a vertical configuration. The typical undercarriage configuration described above is illustrated in FIG. 1 which shows a battery pack 101 configured to be mounted from below, following direction 103, into vehicle chassis 105. Once mounted, battery pack 101 traverses the width of the vehicle and extends substantially between the front and rear suspension assemblies.

Figure 1:
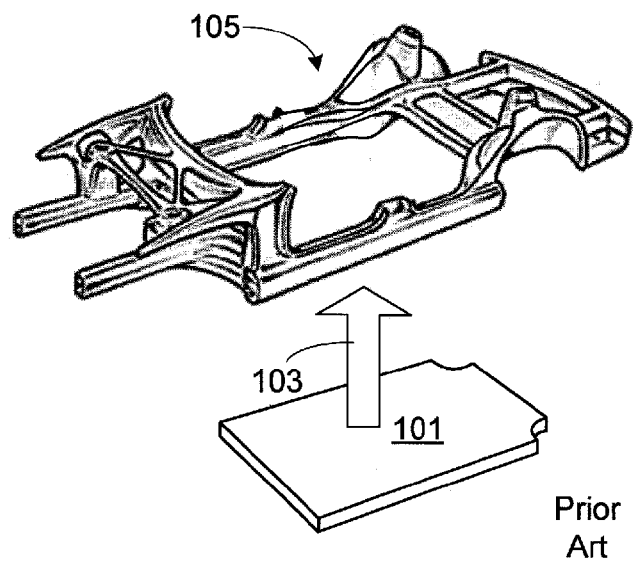
FIG. 1 provides a perspective view of a battery pack and the vehicle chassis to which it is to be mounted.
Figure 2:
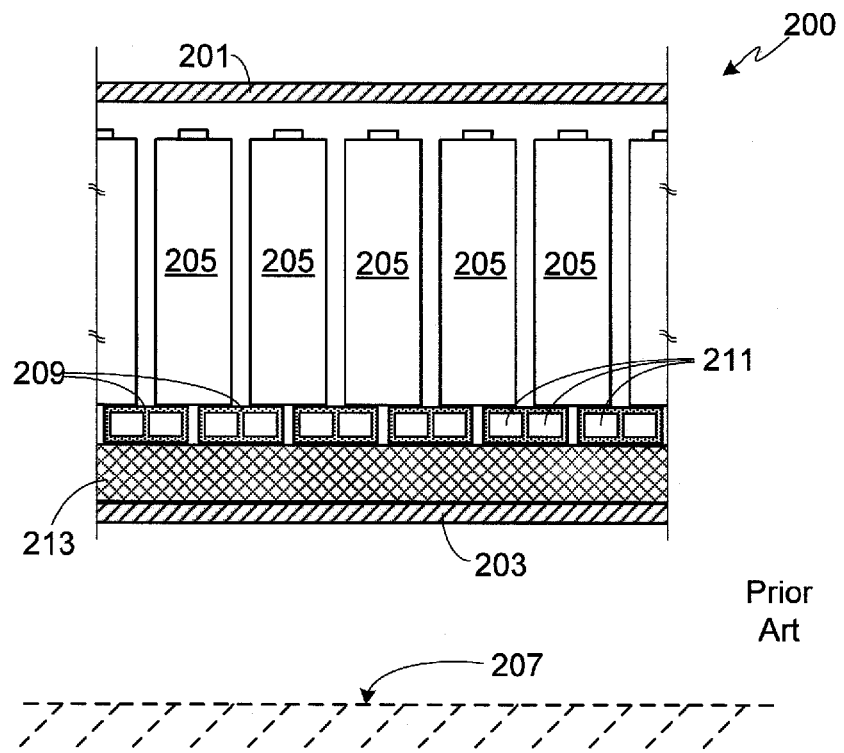
FIG. 2 provides a cross-sectional view of a portion of an exemplary battery pack in accordance with the prior art.
Figure 3:
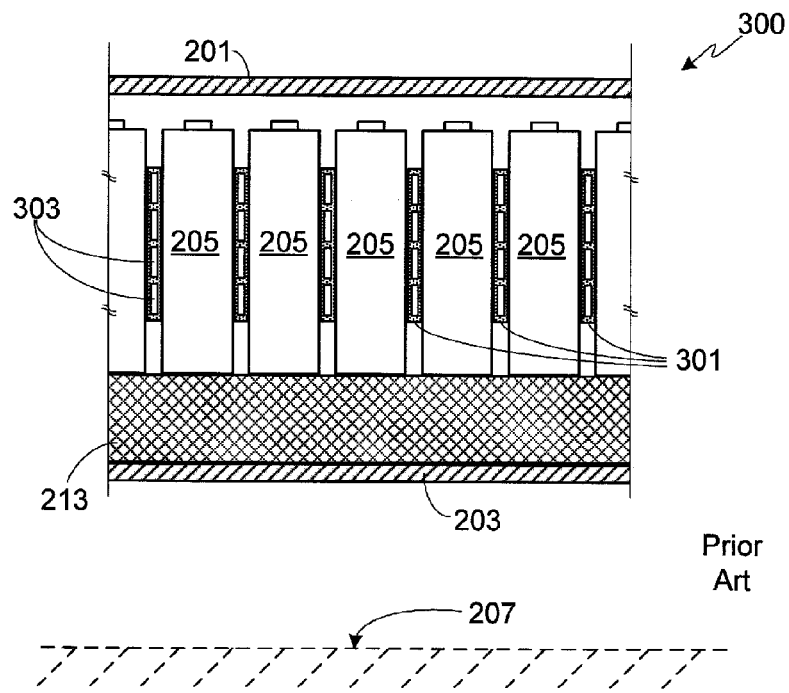
FIG. 3 provides a cross-sectional view of a portion of an alternate battery pack configuration in accordance with the prior art.
Figure 4A:
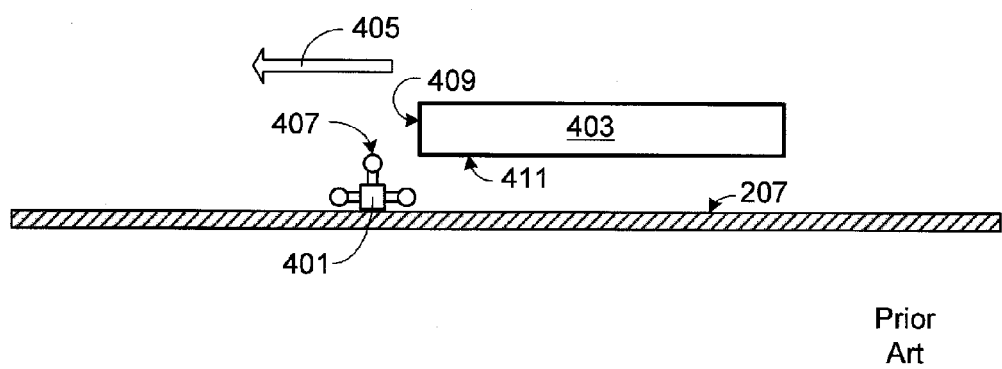
FIG. 4A provides a side view of a conventional battery pack prior to passing over a piece of road debris in the form of a three-ball hitch.
Figure 4B:
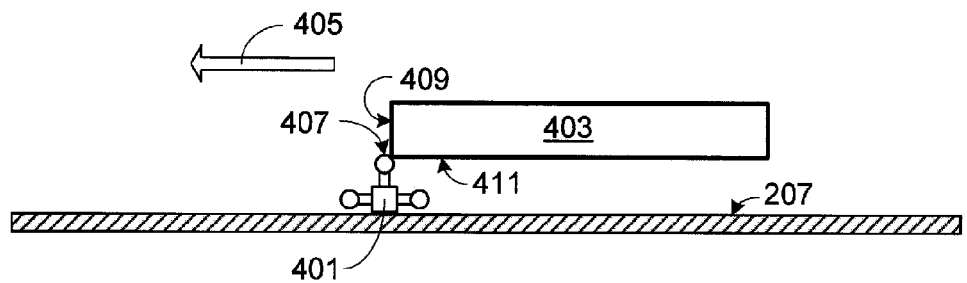
FIG. 4B provides a side view of the conventional battery pack of FIG. 4A upon initial contact with the three-ball hitch.
Figure 4C:
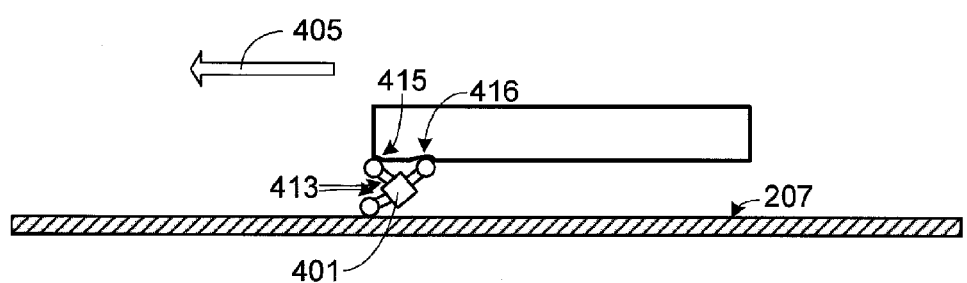
FIG. 4C provides a side view of the conventional battery pack of FIG. 4B as the battery pack starts to deform while passing over the three-ball hitch.
Figure 4D:
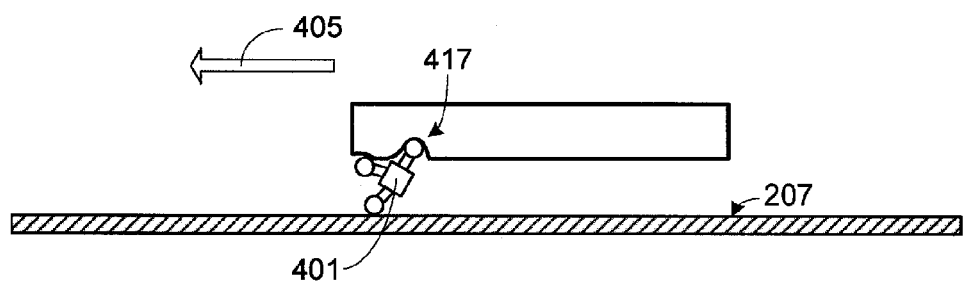
FIG. 4D provides a side view of the conventional battery pack of FIG. 4C as the three-ball hitch punctures the pack.

FIGS. 2 and 3 provide cross-sectional views of exemplary battery configurations suitable for use in a battery pack such as that shown in FIG. 1. For purposes of clarity, battery interconnects and battery mounts are not included in either of these figures. Visible in FIGS. 2 and 3 is a portion of the upper pack enclosure panel 201, a portion of the lower pack enclosure panel 203, and a plurality of batteries 205. Note that the enclosure side panels are not shown in this view. Although the invention is not restricted to a particular battery pack configuration, nor is it restricted to a particular battery form-factor, in the illustrated configurations cylindrical batteries are used, for example batteries utilizing an 18650 form-factor. In a typical configuration, the axis of each battery, i.e. the cylindrical axis, is substantially perpendicular to both lower enclosure panel 203 and surface 207 of the road. In battery pack configuration 200, interposed between the base of each cylindrical battery 205 and lower panel 203 are a plurality of cooling conduits 209 through which a liquid coolant, i.e., a heat transfer medium, is pumped. Alternately, and as illustrated in battery pack configuration 300, cooling conduits 301 are interposed between the sides of adjacent batteries 205. In both of the illustrated configurations, the cooling conduits are aligned with lower panel 203, resulting in the coolant within channels 211/303 flowing in a direction substantially perpendicular to the axes of the cylindrical batteries. By regulating the flow of coolant within conduits 209/301 and/or regulating the transfer of heat from the coolant to another temperature control system, the temperature of cells 205 may be regulated so that the cells remain within their preferred operating range. As it is generally desirable to limit the unintentional transfer of thermal energy between the batteries/cooling conduits and the battery pack enclosure, preferably one or more thermally insulating layers 213 are interposed between the batteries/cooling conduits and the battery pack enclosure as shown. Thermally insulating layer(s) 213 may be comprised of air or some other thermally insulating material that preferably has a thermal conductivity of less than $1.0\ Wm^{-1}K^{-1}$ at 25° C., and more preferably less than $0.2\ Wm^{-1}K^{-1}$ at 25° C.

FIGS. 4A-4D illustrate the effect of a piece of road debris 401 on an undercarriage mounted battery pack 403 in a conventional EV. To insure clarity, the only portion of the vehicle shown is the battery pack. Additionally, while a three-ball hitch is used to represent the road debris, it will be understood that other forms of road debris may have the same or similar effect on a conventional EV if the debris is too large to pass unheeded under the undercarriage mounted battery pack.

As the vehicle moves forward in a direction 405, the uppermost portion 407 of debris 401, which is too high to pass unheeded under the pack, impacts the leading edge 409 of the battery pack. (See FIG. 4B). Unless the car is able to stop immediately, the continued forward progress of the vehicle will deform the debris, deform the battery pack, or deform both, depending upon the hardness of debris object 401 relative to that of the battery pack, i.e., the leading battery pack surface 409 and lower battery pack panel 411. (See hitch deformation at 413 and pack deformation at 415/416 in FIG. 4C). Depending upon the size and shape of the road debris, continued motion of the vehicle in direction 405 may lead to the battery pack being severely deformed or punctured as the debris is forced upwards into the pack. (See region 417 in FIG. 4D). Severe damage to the battery pack may lead to one or more of the batteries within the pack entering into thermal runaway, typically due to either a short within the battery pack or an internal short within one or more of the individual batteries within the pack.

The inventors have found that it is possible to capture a piece of road debris before the debris passes under, and possibly damages, the EV's battery pack. In accordance with the invention, a debris capture plate is located in front of the battery pack and configured to trap debris that would otherwise damage the battery pack. It will be appreciated that it most instances the debris capture plate is only intended to prevent potentially catastrophic battery pack damage from occurring. As such, the intent is that once debris is trapped, the driver would pull the vehicle off of the road as soon as possible so that the debris can be removed and the capture plate repaired or replaced.

Figure 5:
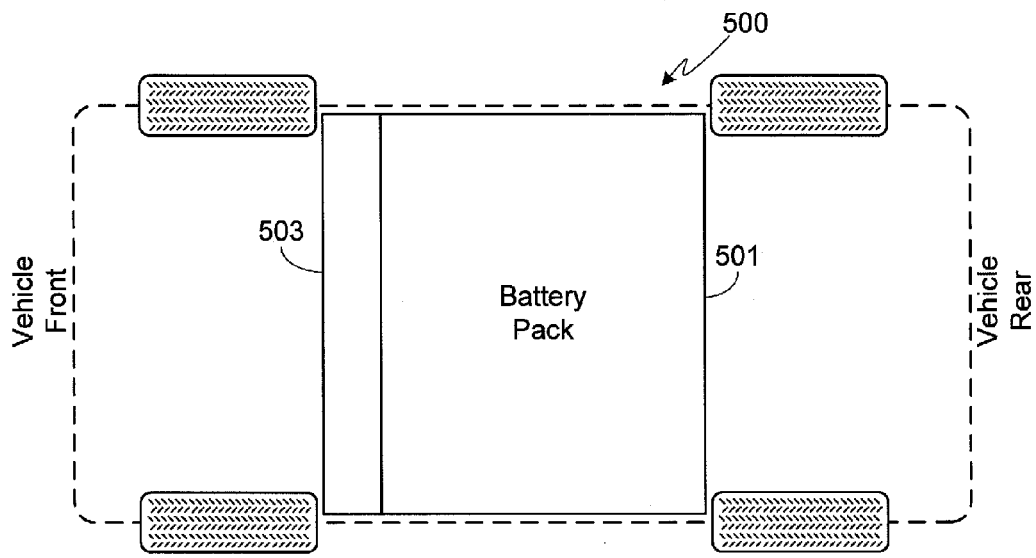
FIG. 5 illustrates an exemplary mounting configuration for a capture plate in accordance with the invention.
Figure 6:
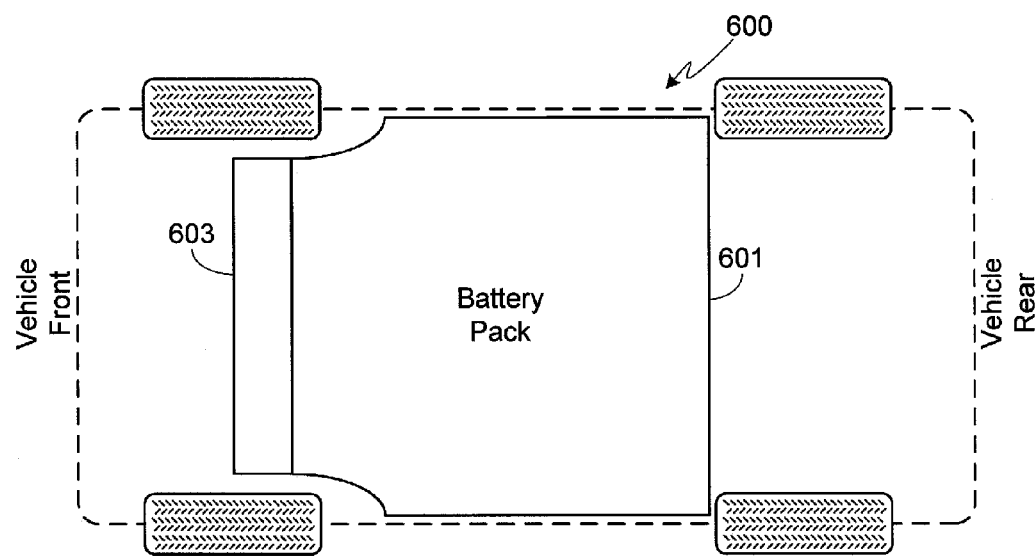
FIG. 6 illustrates an alternate mounting configuration for the capture plate of the invention.

FIGS. 5 and 6 illustrate a couple of possible mounting configurations for a capture plate in accordance with the invention. It should be understood, however, that the exact mounting location depends at least in part upon the size and location of the battery pack relative to the vehicle undercarriage. In FIG. 5, battery pack 501 extends across nearly the full width of vehicle 500. Capture plate 503, which is preferably attached to the front of the battery pack 501 as described below, extends across the full width of the pack. In vehicle 600 shown in FIG. 6, the front of battery pack 601 is shaped similarly to that shown in FIG. 1, thus allowing the battery pack to extend further forward than in the configuration shown in FIG. 5. Preferably capture plate 603 only extends across the width of the front portion of the battery pack as shown.

Figure 7:
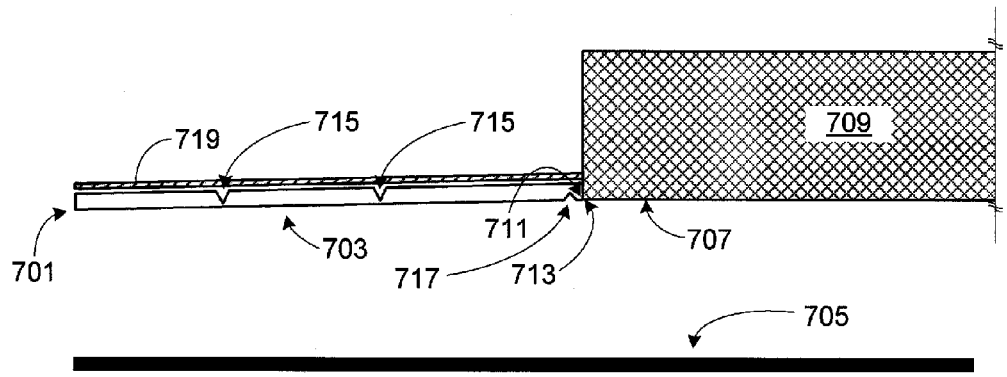
FIG. 7 provides a side view of a preferred embodiment of the debris capture plate assembly of the invention.

When the leading edge of the capture plate is hit by a piece of road debris, the plate is designed to deform and trap the debris, thereby preventing the debris from passing under and potentially damaging the battery pack. To insure that the debris hits the capture plate, the plate is angled slightly downward with respect to the front lower surface of the pack. This aspect of the capture plate is illustrated in FIG. 7 which shows that the front edge 701 of capture plate 703 is slightly lower, i.e., closer to the road surface 705, than front lower surface 707 of battery pack 709. Note that only the front portion of battery pack 709 is shown. Typically edge 701 is positioned between 5 and 25 millimeters lower than lower battery pack surface 707, preferably between 10 and 20 millimeters lower, still more preferably between 10 and 15 millimeters lower, and in the preferred embodiment edge 701 is positioned approximately 10 millimeters lower than lower battery pack surface 707. Capture plate 701 may be made from any of a variety of deformable materials that provide the desired strength, although preferably capture plate 701 is fabricated from a metal such as aluminum, for example a sheet of aluminum at least 1 millimeter thick, and preferably at least 2 millimeters thick; alternately, fabricated from steel, for example a sheet of steel at least 0.5 millimeters thick, and preferably at least 1 millimeter thick.

As noted above, capture plate 703 is designed to deform when a piece of road debris is large enough to hit the capture plate's leading edge 701 as opposed to passing unheeded under the plate. Furthermore, as plate 703 deforms it is configured to deform in such a way that the road debris is trapped, thereby preventing the object from impacting and potentially damaging battery pack 709. A number of design features are integrated into the debris trapping system in order to insure that once the debris impacts the leading edge 701 of the capture plate, the debris cannot continue its path under the battery pack. These features are illustrated in FIG. 7 as well as the perspective view of the capture plate provided in FIG. 8. FIGS. 9-13 illustrate the deformation and trapping process provided by the invention.

In order to prevent the debris from impacting the leading edge 701 of capture plate 703 and then continuing its passage under the pack, it is important that the capture plate create an effective barrier to further forward motion of the debris. To create such a barrier, the trailing edge 711 of capture plate 703 is positioned in front of battery pack 709 and firmly attached to a vehicle structure positioned in front of battery pack 709. In the preferred embodiment, trailing edge 711 is strongly attached to a front portion of the battery pack enclosure assembly, e.g., directly attached to the leading surface 713 of battery pack 709. By firmly attaching the trailing edge 711 of the capture plate 703 to battery pack 709, as the plate deforms when it is hit by the debris, a wall is formed. In one embodiment, edge 711 is welded or brazed to battery pack surface 713. In an alternate embodiment, a lip formed on trailing edge 711 of the capture plate is bolted or riveted to battery pack surface 713. In yet another embodiment, edge 711 is bonded to battery pack surface 713.

Figure 8:
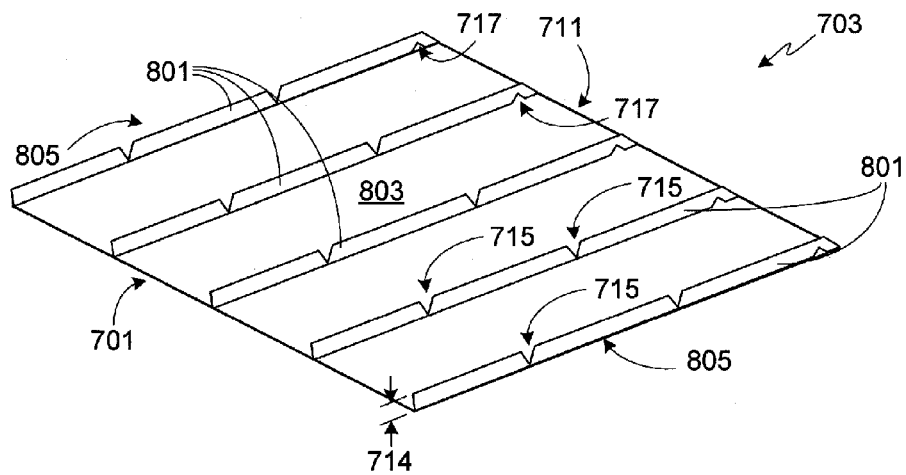
FIG. 8 provides a perspective view of the capture plate shown in FIG. 7.

In addition to firmly attaching trailing edge 711 to the front surface 713 of the battery pack in order to create an effective barrier to further forward movement of the debris, it is essential that the capture plate 703 deform in such a way that the debris is trapped by the deformed plate. To help accomplish this goal, a plurality of plate stiffeners 801 are attached to the plate, preferably attached to upper surface 803 as shown in FIG. 8. Stiffeners 801 may be formed during the same process as that used to form plate 703, for example utilizing an extrusion process. Alternately, stiffeners 801 may be welded, brazed or bonded to surface 803 of plate 703. Alternately, a mounting lip may be formed on each stiffener 801 which can then be welded, brazed, bonded, riveted, or bolted to plate 703. Stiffeners 801 may be fabricated from the same material as used to form plate 703, thereby simplifying fabrication of the assembly, or fabricated from a different material. In the preferred embodiment, stiffeners 801 are fabricated from aluminum at least 1 millimeter thick, and preferably at least 2 millimeters thick, or fabricated from steel at least 0.5 millimeters thick, and preferably at least 1 millimeter thick. Typically the height 714 of each stiffener 801 is between 5 and 25 millimeters high, and preferably approximately 15 millimeters high.

Figure 9:
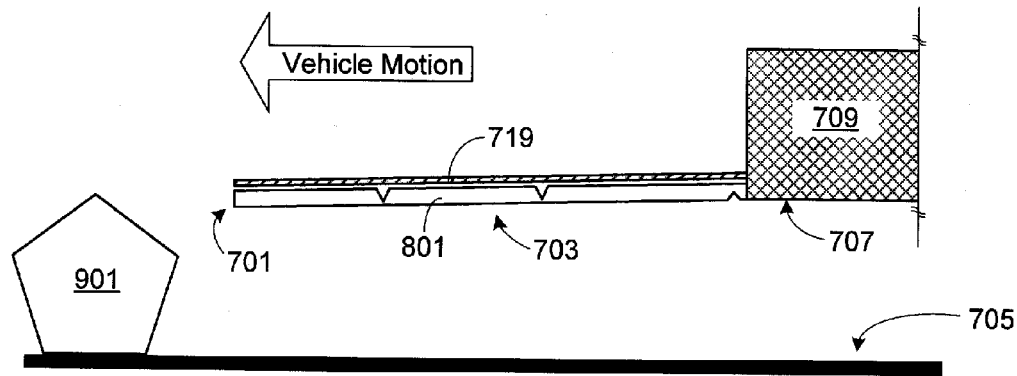
FIG. 9 provides a side view of the debris capture plate assembly of FIG. 7 immediately prior to the vehicle passing over a piece of road debris.
Figure 10:
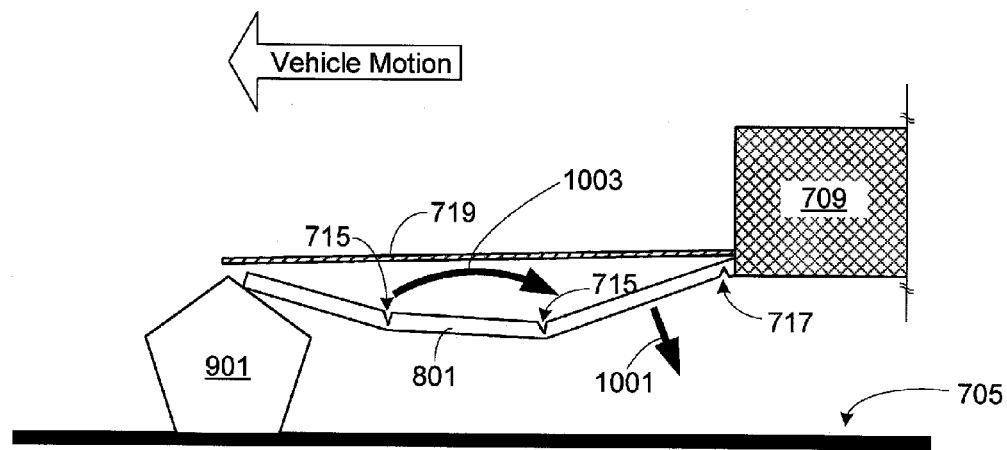
FIG. 10 illustrates the initial stages of capture plate deformation for the debris capture plate assembly shown in FIG. 9.
Figure 11:
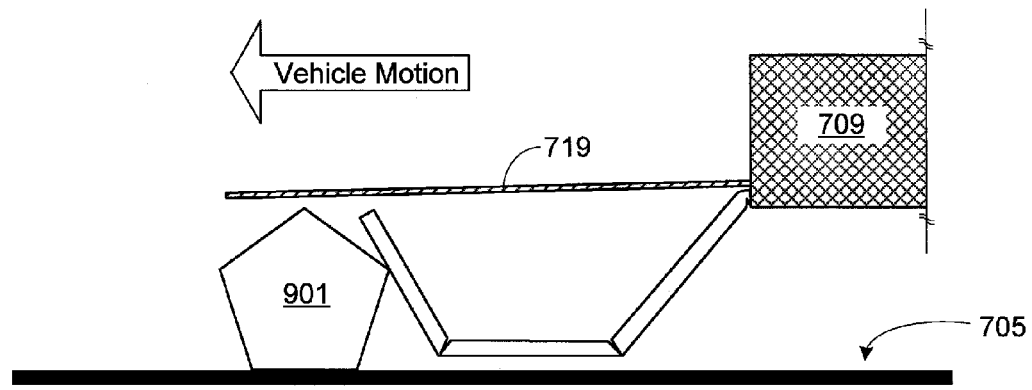
FIG. 11 illustrates the capture plate assembly shown in FIG. 10 after the debris has caused a substantial deformation of the capture plate.
Figure 12:
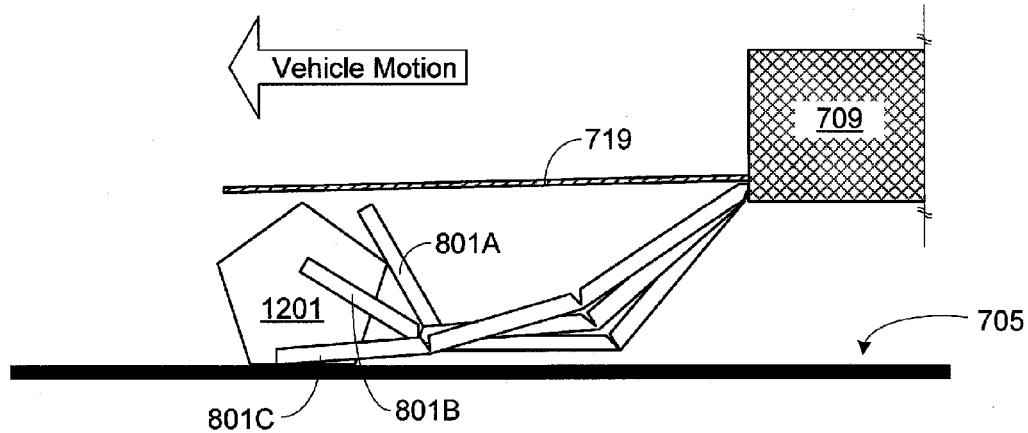
FIG. 12 illustrates the ability of the capture plate stiffeners to deform somewhat independently of one another in order to trap a piece of road debris.

Each plate stiffener 801 includes one or more features that promote a preconfigured pattern of plate deformation as described in detail below. In the preferred embodiment, the deformation features consist of several notches 715 located along the upper surface of each plate stiffener 801. Note that the notches on adjacent stiffeners are preferably aligned relative to each other and to the edge of the capture plate as shown. Additionally, the deformation features preferably include at least one notch 717 located along the lower surface of each plate stiffener 801. In addition to being aligned relative to adjacent stiffeners, preferably notches 717 are located in close proximity to the juncture of capture plate 703 and battery pack 709 as shown. In general, notches 715 and 717 promote a long wavelength deformation mode, specifically biasing plastic hinge formation to pass through the notches. This deformation process is illustrated in FIGS. 9 and 10 which show the initial stages of plate deformation as the vehicle drives over a piece of road debris 901. As shown, once leading capture plate edge 701 hits debris 901, notches 717 cause the rear portion of capture plate 703 to deform in a downward direction 1001 while notches 715 cause plate 703 to buckle in a direction 1003. As the vehicle continues its forward motion, debris 901 continues to cause plate 703 to buckle as shown in FIG. 11, thereby creating a wall that prevents debris 901 from impacting battery pack 709.

While it is important for the capture plate 703 to remain in place during normal vehicle operation, it is also important for the plate to deform as intended, and as promoted by stiffeners 801 and notches 715/717. In order to allow capture plate 703 to deform as desired, the capture plate is only lightly attached to the vehicle's structure, except for the rigid attachment at trailing edge 711. Accordingly and in the preferred embodiment, capture plate 703 is lightly attached to a plate support structure, e.g., a portion of the vehicle chassis (not shown), along front edge 701 and plate side edges 805. Alternately, or in addition to the edge attachments, capture plate 703 may be attached to the support structure at various points on upper plate surface 803. The weak points of attachment may be achieved using a relatively low-strength adhesive. Alternately, capture plate 703 may be tacked to the underlying vehicle structure using a small tacking weld or braze. Alternately, an easily broken mechanical coupler may be used to hold capture plate 703 in place until it hits a piece of road debris, at which time the mechanical couplers break and allow the capture plate to deform.

Figure 13:
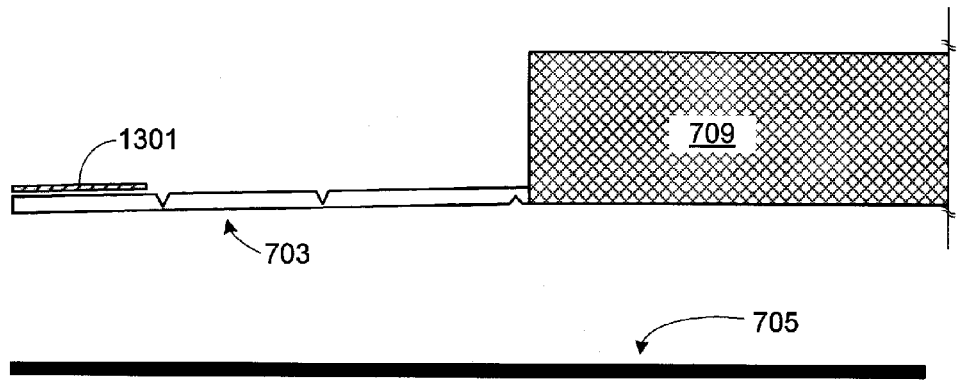
FIG. 13 illustrates a modified capture plate assembly based on the assembly shown in FIG. 7.

In at least one embodiment of the invention, a rigid blocking plate 719 is mounted directly above capture plate 703 as shown in FIGS. 7 and 9-12. Unlike capture plate 703, blocking plate 719 is rigidly coupled around its entire perimeter to the underlying vehicle structure, for example by welding, brazing, bonding or through the use of mechanical fasteners (e.g., bolts, rivets, etc.). The primary purpose of blocking plate 719 is to prevent upwards deflection of the capture plate 703 when it collides with a piece of road debris. As such, it is not necessary for the blocking plate to extend over the entire length of the capture plate. For example and as shown in FIG. 13, a blocking plate 1301 may be used that is only adjacent to the leading edge 701 of the capture plate, thus preventing the capture plate from being upwardly deflected. It will be appreciated that in addition to controlling the initial deformation of the capture plate, blocking plate 719 may also be used to prevent debris from passing over the capture plate.

Although notches 715 and 717 bias the capture plate to deform in a predefined manner, hinging about the notches, it will be appreciated that the exact nature of the plate's deformation depends upon the characteristics of the debris, specifically the size, shape, weight and material qualities of the debris. As a result, in some impacts one or more regions of the capture plate, in particular regions that lie between stiffeners, may rupture upon impact. Additionally, in some impacts the stiffeners will allow the capture plate to deform around the debris. For example, in FIG. 12 debris 1201 hits the capture plate somewhat in the middle of the plate. As a result, stiffener 801A folds up in front of the debris; stiffener 801B partially folds up next to the debris; and stiffener 801C remains somewhat extended beside the debris. As a result, a web is formed by the stiffeners which capture the debris. Note that for purposes of clarity, FIG. 12 does not show those portions of capture plate 703 that extend between adjacent stiffeners.

Figure 14:
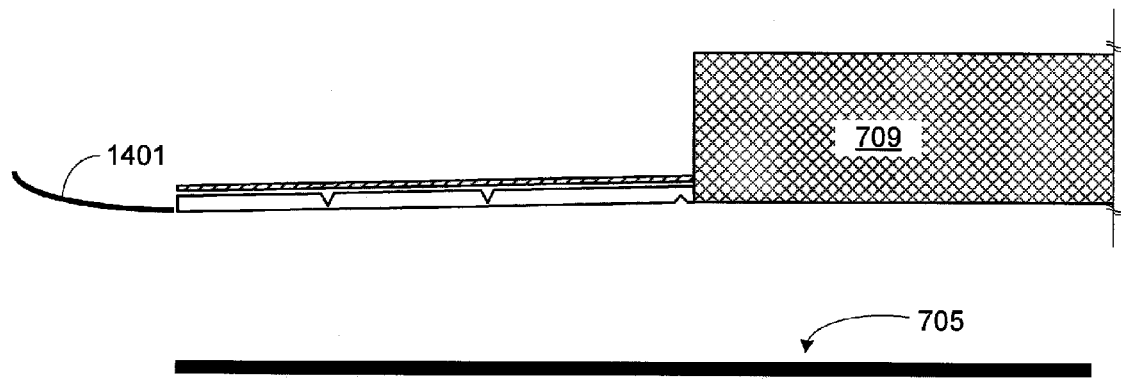
FIG. 14 illustrates the use of an aerodynamic shield placed in front of the capture plate assembly.

In some embodiments the inventors envision positioning an aerodynamic shield in front of the capture plate assembly, thus minimizing drag due to this assembly. In order to insure that the aerodynamic shield does not affect the performance of the capture plate assembly, it is preferably formed of a material such as a light-weight plastic or composite that easily shatters or deforms when hit by the debris. FIG. 14 illustrates an aerodynamic shield 1401 positioned in front of the capture plate assembly shown in FIGS. 7-12.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack protection system, comprising:
a battery pack enclosure mounted under an electric vehicle, wherein said battery pack enclosure is configured to house a plurality of batteries;
a debris capture plate mounted in front of said battery pack enclosure, wherein a trailing edge of said debris capture plate is coupled to said battery pack enclosure, and wherein a leading edge of said debris capture plate is positioned closer to an underlying road surface than a lowermost battery pack enclosure surface; and
a plurality of plate stiffeners coupled to said debris capture plate, wherein each plate stiffener is longitudinally coupled to said debris capture plate such that a lengthwise axis corresponding to each plate stiffener is substantially parallel to a longitudinal axis of said electric vehicle, wherein each plate stiffener of said plurality of plate stiffeners includes at least one deformation control feature that promotes a preconfigured pattern of debris capture plate deformation when a piece of debris impacts said leading edge of said debris capture plate.

2. The battery pack protection system of claim 1, further comprising a blocking plate mounted above said leading edge of said debris capture plate, wherein said blocking plate promotes downward deformation of said leading edge of said debris capture plate when said piece of debris impacts said leading edge.

3. The battery pack protection system of claim 2, wherein said blocking plate extends over an entire length of said debris capture plate.

4. The battery pack protection system of claim 1, wherein said debris capture plate extends across a full width of a front portion of said battery pack enclosure.

5. The battery pack protection system of claim 1, wherein said at least one deformation control feature on each plate stiffener is comprised of a plurality of notches, wherein said plurality of notches are located along an upper edge of each plate stiffener, and wherein said plurality of notches promote plastic hinge formation of said debris capture plate through said plurality of notches.

6. The battery pack protection system of claim 5, wherein said plurality of notches corresponding to each plate stiffener are aligned between adjacent plate stiffeners.

7. The battery pack protection system of claim 1, wherein said at least one deformation control feature on each plate stiffener is comprised of at least one notch, wherein said at least one notch is located along a lower edge of each plate stiffener, wherein said at least one notch is located near said trailing edge of said debris capture plate, and wherein said at least one notch promotes downward deformation of a rear portion of said debris capture plate.

8. The battery pack protection system of claim 7, wherein said at least one notch corresponding to each plate stiffener is aligned between adjacent plate stiffeners.

9. The battery pack protection system of claim 1, wherein said trailing edge of said debris capture plate is firmly attached to a front portion of said battery pack enclosure.

10. The battery pack protection system of claim 1, wherein a perimeter of said debris capture plate is weakly attached to a plate support structure, wherein said weakly attached perimeter excludes said trailing edge of said debris capture plate, wherein said trailing edge of said debris capture plate is strongly attached to a front portion of said battery pack enclosure.

11. The battery pack protection system of claim 10, further comprising a plurality of tack joints formed using a low strength adhesive, wherein said plurality of tack joints weakly attach said perimeter of said debris capture plate excluding said trailing edge to said plate support structure.

12. The battery pack protection system of claim 10, further comprising a plurality of tack welds, wherein said plurality of tack welds weakly attach said perimeter of said debris capture plate excluding said trailing edge to said plate support structure.

13. The battery pack protection system of claim 10, wherein said trailing edge of said debris capture plate is attached to said front portion of said battery pack enclosure via one of welding, brazing or bonding.

14. The battery pack protection system of claim 10, wherein said trailing edge of said debris capture plate is attached to said front portion of said battery pack enclosure using a plurality of bolts.

15. The battery pack protection system of claim 1, wherein said debris capture plate is mounted at an angle relative to said underlying road surface, wherein said leading edge of said debris capture plate is positioned closer to said underlying road surface than said trailing edge of said debris capture plate.

16. The battery pack protection system of claim 1, wherein said leading edge of said debris capture plate is positioned between 5 millimeters and 25 millimeters closer to said underlying road surface than said lowermost battery pack enclosure surface.

17. The battery pack protection system of claim 1, wherein said debris capture plate is fabricated from a metal.

18. The battery pack protection system of claim 17, wherein said metal is selected from the group of materials consisting of aluminum and steel.

19. The battery pack protection system of claim 1, wherein said plurality of plate stiffeners are fabricated from a metal, wherein said metal is selected from the group of materials consisting of aluminum and steel.

20. The battery pack protection system of claim 1, wherein said plurality of plate stiffeners are attached to an upper surface of said debris capture plate via one of welding, brazing or bonding.

21. The battery pack protection system of claim 1, wherein said plurality of plate stiffeners are attached to an upper surface of said debris capture plate using a plurality of fasteners.

22. The battery pack protection system of claim 21, said plurality of fasteners comprising a plurality of bolts.

\* \* \* \* \*